(12) United States Patent
Huang

(10) Patent No.: US 9,831,774 B2
(45) Date of Patent: Nov. 28, 2017

(54) CONSTANT ON-TIME PULSE WIDTH CONTROL-BASED SCHEME USED IN VOLTAGE CONVERTER

(71) Applicant: MEDIATEK INC., Hsin-Chu (TW)

(72) Inventor: Hua-Chiang Huang, Taoyuan (TW)

(73) Assignee: MediaTek Inc., Hsin-Chu (TW)

( * ) Notice: Subject to any disclaimer, the term of this patent is extended or adjusted under 35 U.S.C. 154(b) by 8 days.

(21) Appl. No.: 15/007,228

(22) Filed: Jan. 27, 2016

(65) Prior Publication Data

US 2016/0301307 A1 Oct. 13, 2016

Related U.S. Application Data

(60) Provisional application No. 62/145,212, filed on Apr. 9, 2015.

(51) Int. Cl.
| | |
|---|---|
| H02M 3/158 | (2006.01) |
| H02M 3/156 | (2006.01) |
| H02M 1/08 | (2006.01) |
| H02M 1/00 | (2006.01) |

(52) U.S. Cl.
CPC ............ *H02M 3/158* (2013.01); *H02M 1/08* (2013.01); *H02M 3/156* (2013.01); *H02M 2001/0009* (2013.01)

(58) Field of Classification Search
CPC ......... H02M 1/08; H02M 3/156; H02M 3/157
USPC .................... 323/282, 283, 285, 286, 288
See application file for complete search history.

(56) References Cited

U.S. PATENT DOCUMENTS

| | | | |
|---|---|---|---|
| 6,366,070 B1 | 4/2002 | Cooke | |
| 7,541,795 B1* | 6/2009 | Smith | H02M 1/32 |
| | | | 323/283 |
| 7,888,923 B2 | 2/2011 | Sahu | |
| 2009/0128113 A1* | 5/2009 | Ryoo | G05F 1/618 |
| | | | 323/283 |
| 2011/0031948 A1 | 2/2011 | Chien | |
| 2011/0234188 A1 | 9/2011 | Chiu | |
| 2011/0267853 A1* | 11/2011 | Yang | H02M 1/32 |
| | | | 363/56.01 |
| 2016/0006336 A1* | 1/2016 | Bennett | H02M 1/00 |
| | | | 323/271 |
| 2016/0301307 A1* | 10/2016 | Huang | H02M 3/156 |
| 2017/0025952 A1* | 1/2017 | Huang | H02M 3/156 |

* cited by examiner

*Primary Examiner* — Jeffrey Sterrett
(74) *Attorney, Agent, or Firm* — Wolf, Greenfield & Sacks, P.C.

(57) ABSTRACT

A constant on-time pulse width control-based apparatus used in a voltage converter includes a comparator, a logic circuit, and a controller. The comparator is configured for generating a logic control signal to a logic circuit according to two resultant signals of the controller. The logic circuit is configured for generating a pulse control signal with an on-time pulse width to charge an output capacitor of an output stage circuit of the voltage converter according to the logic control signal. The controller is configured for generating the two resultant signals to the comparator by detecting an inductor current signal from an inductor of the output stage circuit, generating a voltage ramp signal, amplifying and generating an output voltage ripple signal based on a reference voltage.

10 Claims, 6 Drawing Sheets

CONSTANT ON-TIME PULSE WIDTH CONTROL-BASED SCHEME USED IN VOLTAGE CONVERTER

CROSS REFERENCE TO RELATED APPLICATIONS

This application claims priority of U.S. provisional application Ser. No. 62/145,212 filed on Apr. 9, 2015, which is entirely incorporated herein by reference.

BACKGROUND

The present invention relates to a voltage converter scheme, and more particularly to a constant on-time pulse width control-based apparatus used in a voltage converter.

Generally speaking, a conventional constant on-time controller is usually limited by small ESR (equivalent series resistor) of its output capacitor. The conventional controller cannot effectively reflect/detect output voltage ripple due to that the ESR is too small. Some conventional schemes are proposed to improve the detection of output voltage ripple. However, a part of these conventional schemes cannot improve poor noise immunity and worse DC voltage regulation, and its signal gain for compensation is too low. In addition, another part of the conventional schemes may further limit the transient response. Additionally, another part of the conventional schemes may adopt a voltage mode control loop and necessarily needs a complicated compensation circuit design due to that it lacks of the current signal for its voltage mode control loop.

SUMMARY

Therefore one of the objectives of the present invention is to provide a constant on-time pulse width control-based apparatus used in a voltage converter especially a DC-to-Dc buck converter, to solve the above-mentioned problems.

According to embodiments of the present invention, a constant on-time pulse width control-based apparatus used in a voltage converter is disclosed. The apparatus comprise a controller, a comparator, and a logic circuit. The comparator is configured for generating a logic control signal to the logic circuit according to two resultant signals of the controller. The logic circuit is coupled to the comparator and configured for generating a pulse control signal with an on-time pulse width to charge an output capacitor of an output stage circuit of the voltage converter according to the logic control signal. The controller is coupled to the comparator and the logic circuit, and configured for generating the two resultant signals to the comparator by detecting an inductor current signal from an inductor of the output stage circuit, generating a voltage ramp signal, amplifying and generating an output voltage ripple signal based on a reference voltage.

According to the embodiments, a constant on-time pulse width control-based method used in a voltage converter is disclosed. The method comprises: using a comparator to generate a logic control signal according to two resultant signals of a controller; generating a pulse control signal with an on-time pulse width to charge an output capacitor of the voltage converter according to the logic control signal; and, using the controller to generate the two resultant signals to the comparator by detecting an inductor current signal from an inductor of the output stage circuit, generating a voltage ramp signal, amplifying and generating an output voltage ripple signal based on a reference voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
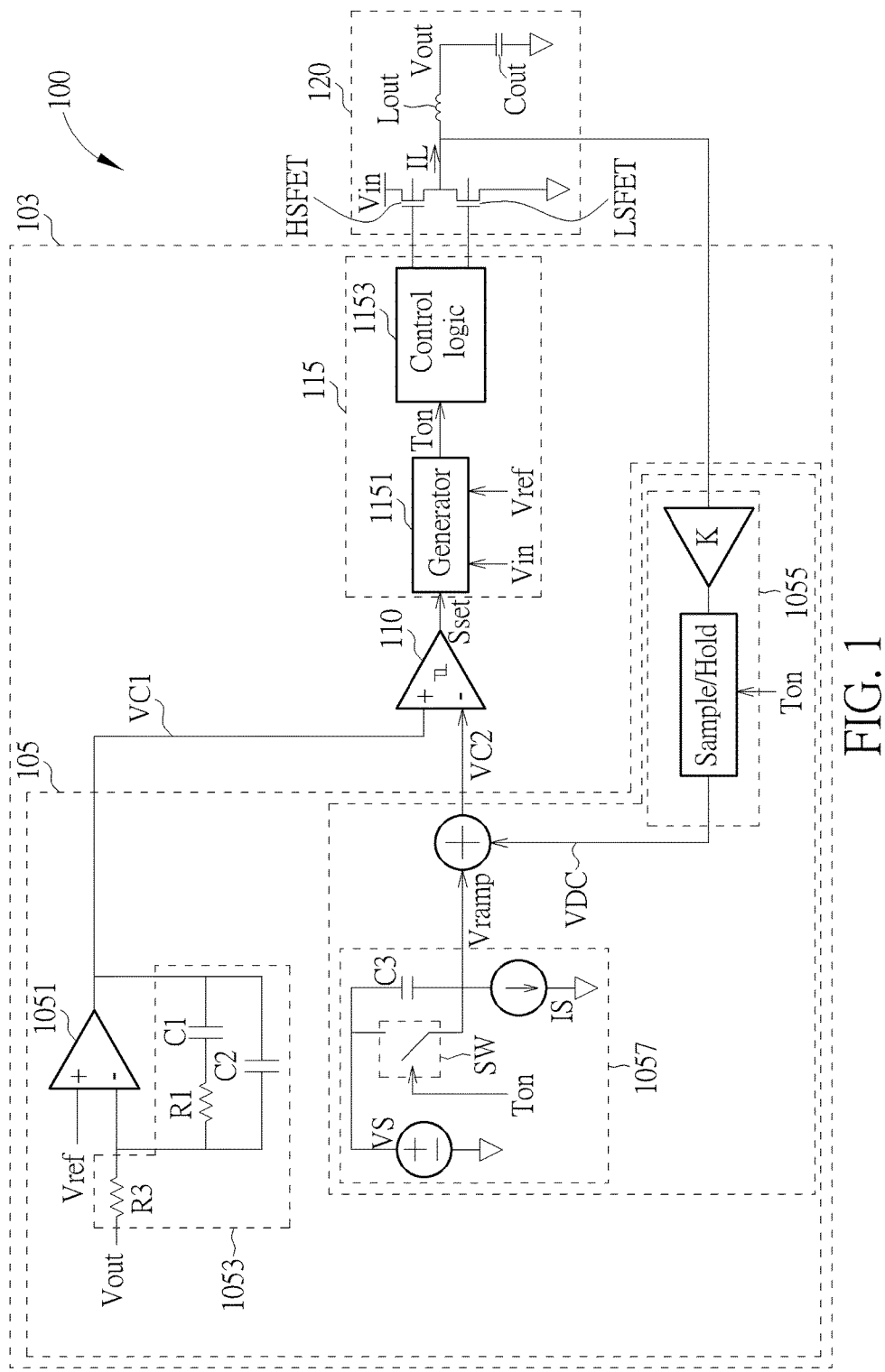
FIG. 1 is a diagram of a voltage converter according to a first embodiment of the present invention.

FIG. 1 is a diagram of a voltage converter 100 according to a first embodiment of the present invention. The voltage converter 100 in this embodiment is a DC-to-Dc buck converter (but not limited) and comprises an apparatus 103 and an output stage circuit 120 wherein the apparatus 103 comprises a controller 105, a comparator 110, and a logic circuit 115. The controller 105 comprises an error amplifier 1051, a high gain compensator 1053, a current sense circuit 1055, and a voltage ramp generator 1057. The logic circuit 115 comprises a generator 1151 and control logic 1153. The output stage circuit 120 comprises two switching transistors HSFET & LSFET, an output inductor Lout, and an output capacitor Cout. The DC-to-DC buck converter 100 is arranged for receiving an input DC voltage Vin to generating and outputting an output DC voltage Vout. The apparatus 103 generates the pulse width control signal Ton to control ON/OFF statuses of the switching transistors HSFET & LSFET to dynamically charge the capacitor Cout during an on-time pulse width of signal Ton, and controls the capacitor Cout to be discharged during an off-time pulse width of Ton. The apparatus 103 includes a constant on-time pulse width control-based operation and can be regarded as a constant on-time pulse width control-based controller. The constant on-time pulse width control-based operation means that the apparatus 103 is arranged to adopt a fixed on-time pulse width during each cycle to control the ON/OFF statuses of the switching transistors HSFET & LSFET in a normal loading condition; the on-time pulse width may be extended or decreased if the loading condition is changed.

Conventional constant on-time controller may be limited by small ESR (equivalent series resistor) of an output capacitor; the conventional controller cannot effectively reflect/detect output voltage ripple due to that the ESR is too small. This causes that the conventional constant on-time controller is without good noise immunity and DC regulation. In the embodiment, the controller 105 combined with comparator 110 and logic circuit 115 is employed so as to solve the problem and also achieves the flexibility of current mode compensation and retains fast transient response. The controller 105 is arranged for generating the two resultant signals VC1 and VC2 to the comparator 110 by detecting an inductor current signal IL from the output inductor Lout, generating a voltage ramp signal Vramp to emulate the pure current ramp, amplifying and generating an output voltage ripple signal to generate the signal VC1 based on a reference voltage Vref and the output voltage signal Vout. The comparator 110 is configured for generating a logic control signal Sset to the logic circuit 115 according to two resultant signals VC1 and VC2. The logic circuit 115 generates the pulse control signal Ton with on-time pulse width to control the switching transistors HSFET & LSFET according to the logic control signal Sset.

In the first embodiment, the error amplifier 1051 is used for amplifying the difference between output voltage signal Vout and reference voltage Vref to generate the output voltage ripple signal as the signal VC1. The high gain compensator 1053 is used for compensating the output voltage ripple signal with a high gain to provide loop stability and better DC voltage regulation for the output voltage signal Vout. The error amplifier 1052 combined with the high gain compensator 1053 can be regarded as an integrator for accumulating the difference between the output voltage signal Vout and reference voltage Vref to generate the output voltage ripple signal so as to amplify the voltage ripple on the output voltage signal Vout. The signal VC1 is transmitted to the positive input of the comparator 110. In addition, in practice, the high gain compensator 1053 comprises resistors R1 & R3 and capacitors C1 & C2. The resistor R1 is connected with the first capacitor C1 in series and the resistor R1 and the first capacitor C1 are connected between the negative input and the output of the error amplifier 1051. The second capacitor C2 is connected with the resistor R1 and the first capacitor C1 in parallel. The output voltage signal Vout passes via the resistor R3 and provided for the error amplifier 1051. The error amplifier 1051 with the high gain compensator 1053 can provide good noise immunity, better DC regulation, and improved loop stability.

The current sense circuit 1055 is used for detecting the inductor current signal IL from the output inductor Lout, and the voltage ramp generator 1057 is used for generating a voltage ramp signal Vramp. The controller 105 can emulate the pure current ramp signal as the signal VC2 provided for the comparator 110 based on the voltage ramp signal Vramp and a DC level of the detected inductor current signal IL. In practice, the voltage ramp generator 1057 comprises a voltage source VS, a current source IS, a capacitor C3, and a switch SW. The voltage source VS is used for providing a direct-current voltage level. The current source IS provides a specific current. The capacitor C3 is connected between the voltage source VS and current source IS in series, and the switch SW is connected with the capacitor C3 in parallel. The output node of the voltage ramp generator 1057 is disposed between the current source IS and the capacitor C3. The switch SW is controlled according to the pulse control signal Ton. The controller 105 controls the switch SW to be closed during the on-time pulse width of signal Ton to provide the direct-current voltage level as the voltage ramp signal Vramp, and controls the switch SW to be open during an off-time pulse width of signal Ton to provide a slowly discharged voltage level as the voltage ramp signal Vramp. The voltage ramp signal Vramp is like a triangular wave signal with a specific slope. Additionally, the current sense circuit 1055 comprises a current sense amplifier 1058 and a sample/hold unit 1059. The current sense amplifier 1058 is used for sensing and amplifying the output inductor current IL with a gain K, and the sample/hold unit 1059 is used for sampling the level of amplified inductor current IL and holding the level. The controller 105 generates the resultant signal VC2 by summing up the voltage ramp signal Vramp and the level VDC outputted from the sample/hold unit 1059 to emulate the pure current ramp signal.

The comparator 110 outputs a logic high level as its output (i.e. the logic control signal Sset) when the signal VC1 is higher than the signal VC2, and outputs a logic low level as its output when the signal VC1 is lower than the signal VC2. The generator 1151 receives the DC input voltage Vin and the reference voltage Vref to generate the pulse control signal Ton with the on-time pulse width according to the logic control signal Sset. The control logic 1153 controls the ON/OFF statuses of the switching transistors HSFET & LSFET according to the signal Ton.

Figure 2:
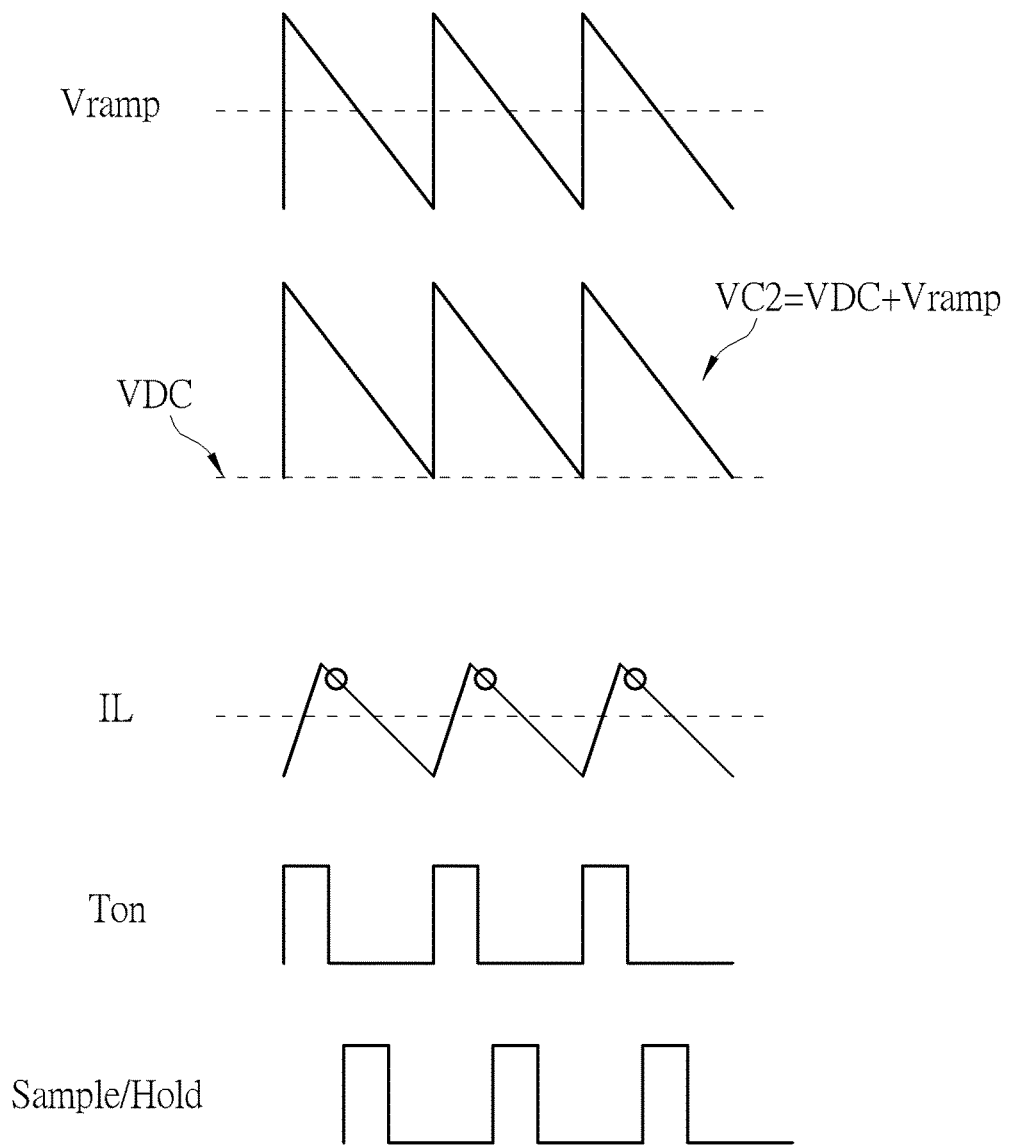
FIG. 2 is a diagram illustrating an example of the signals Vramp, VC2, IL, Ton 'and cycle of sample/hold unit as shown in FIG. 1.
Figure 3:
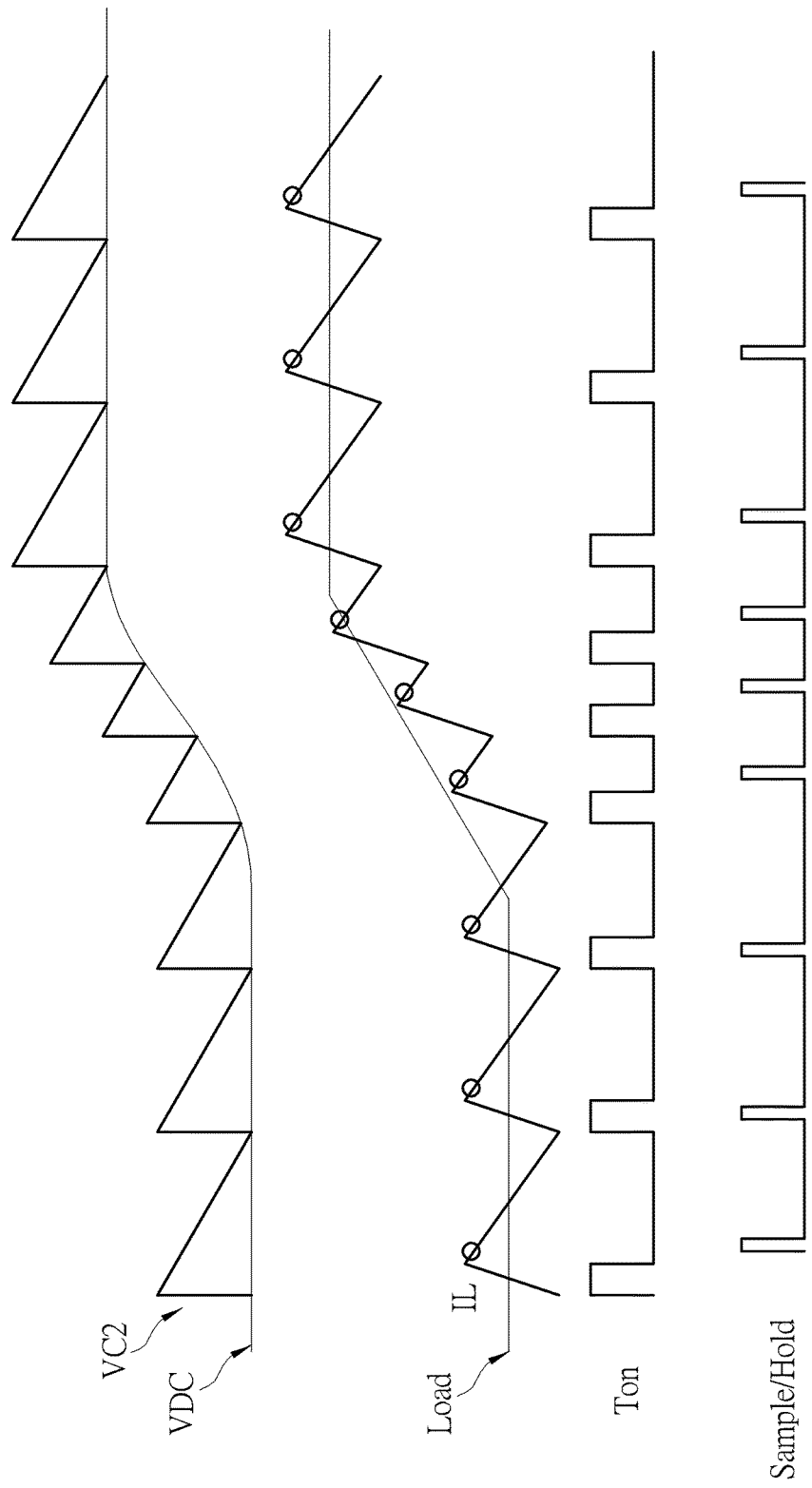
FIG. 3 is a diagram illustrating an example of the signals VC2, IL, Ton, and cycles of sample/hold unit as shown in FIG. 1 when the loading of voltage converter varies.

Please refer to FIG. 2 in conjunction with FIG. 1. FIG. 2 is a diagram illustrating an example of the signals Vramp, VC2, IL, Ton'and cycle of sample/hold unit 1059 as shown in FIG. 1. The signal Vramp for example is a triangle wave signal and is raised to a high level (the DC voltage VS) for a while when the signal VC1 is higher than the signal VC2 (i.e. the on-time pulse width of signal Ton). The signal Vramp is decreased gradually with a slope which is determined by the capacitor C3 and/or current IS. The signal VC2 is generated by adding the signal Vramp to the signal VDC. IL indicates the waveform of the output inductor signal and actually may include some small variations (i.e. current ripple). Ton is a pulse signal generated by the generator 1151 to control the control logic 1153 and its high logic level indicates the on-time pulse width. In this example, the sample/hold unit 1059 is used for sampling and holding the peak amplitude of the output inductor current IL as the level of VDC; the sample/hold unit 1059 works immediately after each on-time pulse of signal Ton is ended. However, this is not intended to be a limitation of the present invention. As shown in FIG. 2, the controller 105 employs the voltage ramp generator 1057 and current sense circuit 1055 to emulate the pure current ramp signal for the output inductor signal IL. It is flexible to increase the amplitude of the signal Vramp by adjusting the capacitor C3 and/or current IS, to improve noise immunity when the DC-to-DC buck converter 100 operates in the current mode and retains the same current gain FIG. 3 is a diagram illustrating an example of the signals VC2, IL, Ton, and cycles of sample/hold unit 1059 as shown in FIG. 1 when the loading of DC-to-DC buck converter 100 varies. As shown in FIG. 3, the loading of DC-to-DC buck converter 100 varies from a light loading condition to a heavy loading condition, and the voltage ramp generator 1057 and current sense circuit 1055 can successfully emulate the pure current ramp that correspondingly varies with the loading condition of DC-to-DC buck converter 100. That is, it is suitable for using the voltage ramp generator 1057 and current sense circuit 1055 to effectively emulate the pure current ramp even though the loading of DC-to-DC buck converter 100 varies. The DC-to-DC buck converter 100 retains the fast transient response.

Figure 4:
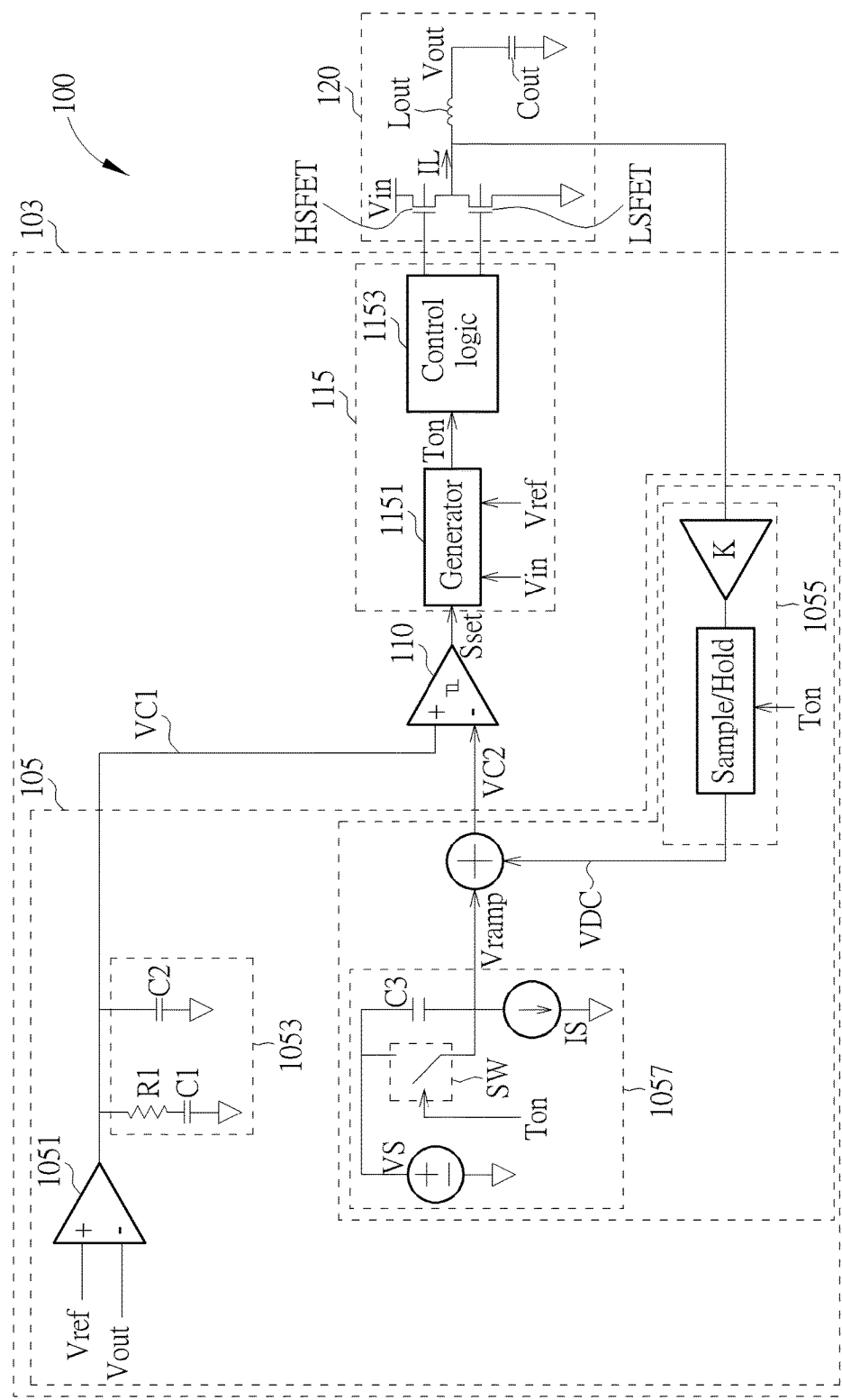
FIG. 4 is a diagram of the voltage converter according to a second embodiment of the present invention.

In another embodiment, the high gain compensator 1053 can be implemented by a different circuit structure that is not connected to the negative input of error amplifier 1051. FIG. 4 is a diagram of the DC-to-DC buck converter 100 according to a second embodiment of the present invention. The high gain compensator 1053 comprises the resistor R1 connected with the first capacitor C1 in series and the second capacitor C2. The resistor R1 combined with the first capacitor C1 are connected between the output of the error amplifier 1051 and the ground level. The second capacitor C2 is connected with the resistor R1 and the first capacitor C1 in parallel. Capacitor C1 is also connected between the output of the error amplifier 1051 and the ground level. The error amplifier 1051 combined with the high gain compensator 1053 in the second embodiment can be also regarded as an integrator for accumulating the difference between the reference voltage Vref and output voltage Vout.

Figure 5:
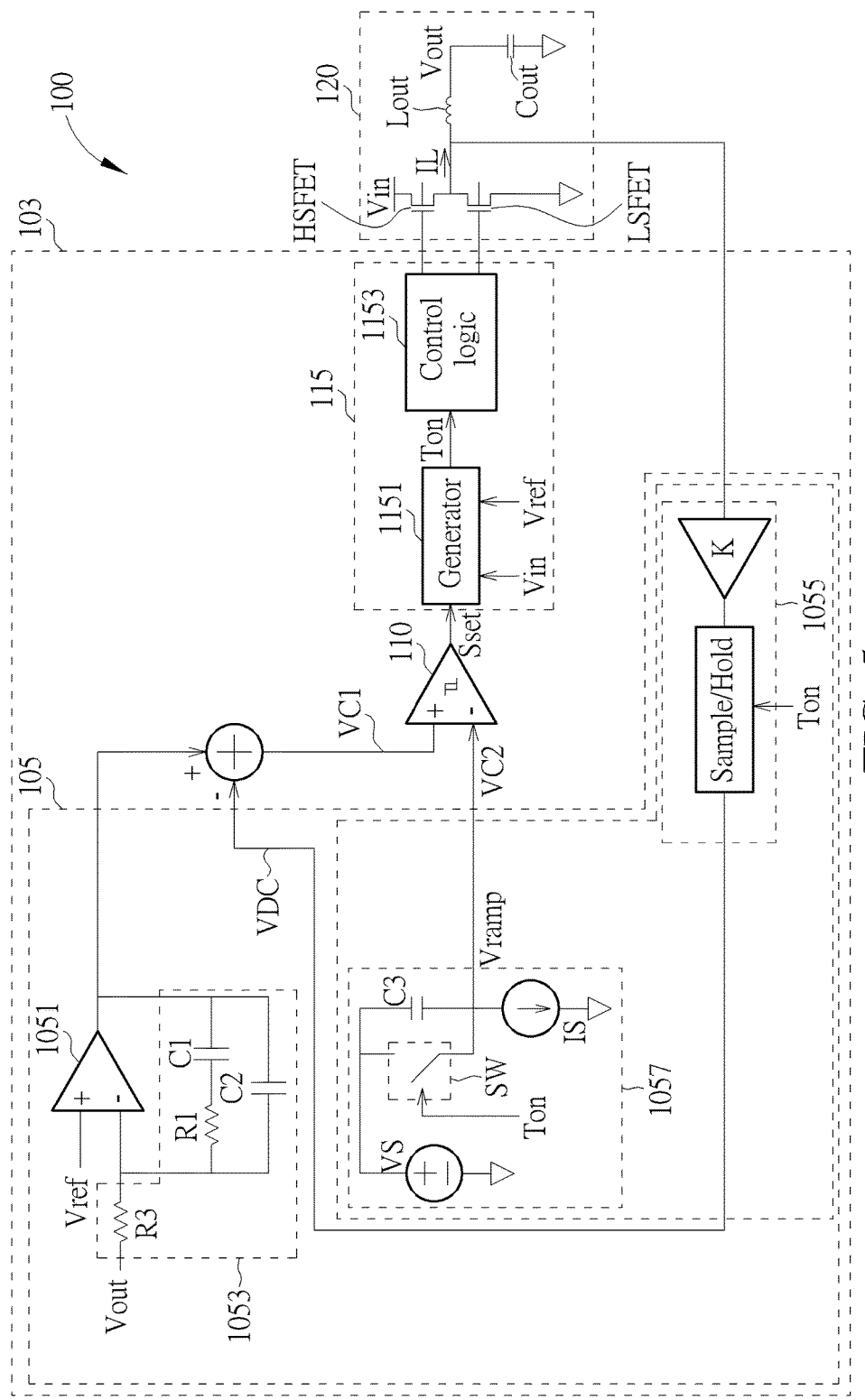
FIG. 5 is a diagram of the voltage converter according to a third embodiment of the present invention.
Figure 6:
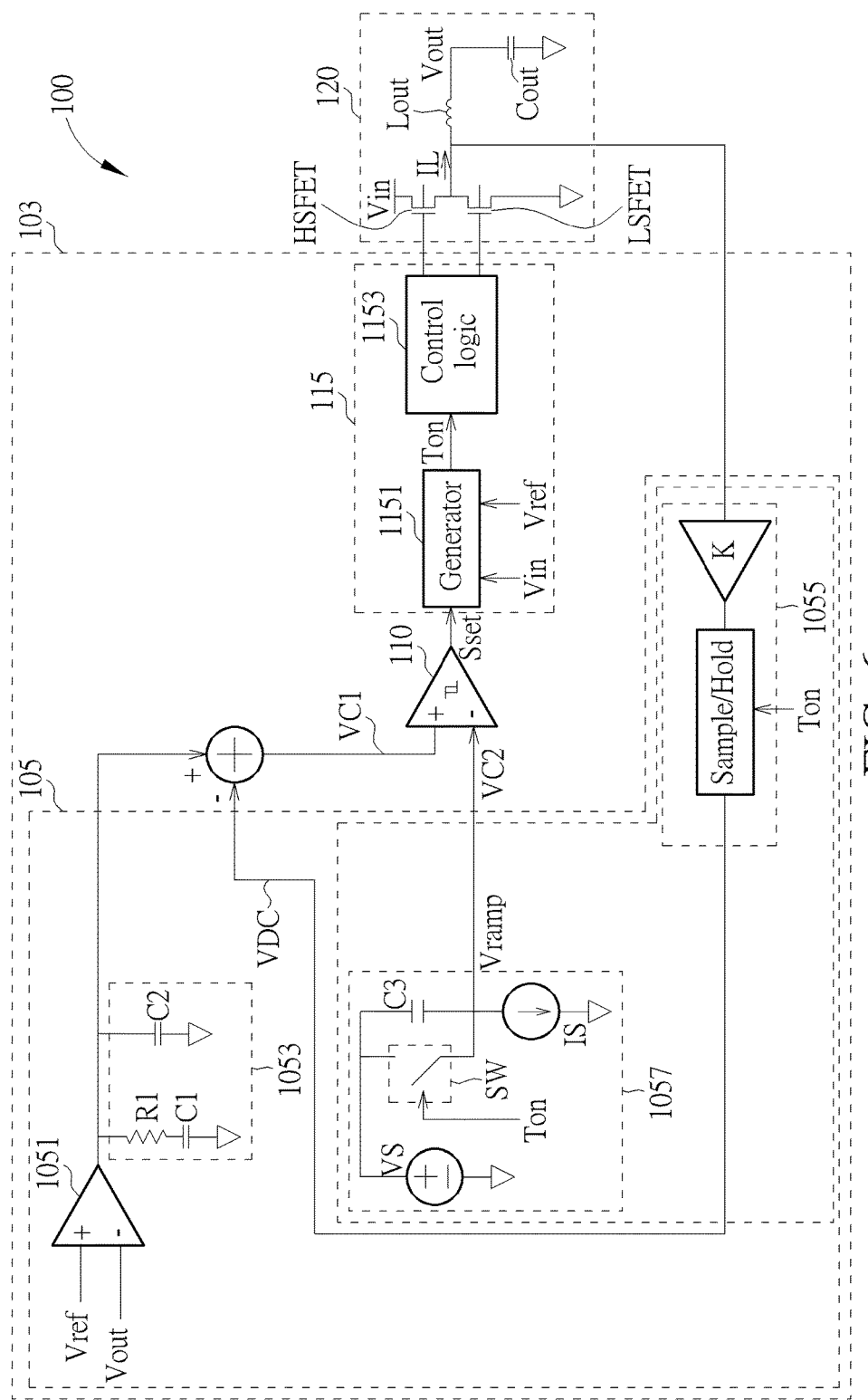
FIG. 6 is a diagram of the voltage converter according to a fourth embodiment of the present invention.

Further, in a modified embodiment, the controller 105 can be arranged to generate the signal VC1 based on the output of error amplifier 1051 and the signal VDC outputted from the sample/hold unit 1059, and to generate the voltage ramp signal Vramp as the signal VC2. FIG. 5 shows a diagram of the DC-to-DC buck converter 100 according to a third embodiment of the present invention. The controller 105 generates the signal VC1 provided for the comparator 110 by subtracting the direct-current level VDC of the detected inductor current signal IL from the amplified output voltage ripple signal of the error amplifier 1051. Similarly, the high gain compensator 1053 shown in FIG. 5 can also be modified. FIG. 6 shows a diagram of the DC-to-DC buck converter 100 according to a fourth embodiment of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A constant on-time pulse width control-based apparatus used in a voltage converter, comprising:
   a comparator configured for generating a logic control signal to a logic circuit according to two resultant signals of a controller;
   the logic circuit, coupled to the comparator, configured for generating a pulse control signal with an on-time pulse width to charge an output capacitor of an output stage circuit of the voltage converter according to the logic control signal; and
   the controller, coupled to the comparator and the logic circuit, configured for generating the two resultant signals with at least:
      a current sense circuit for detecting an inductor current signal from an inductor of the output stage circuit,
      a voltage ramp generator for generating a voltage ramp signal, and
      an error amplifier for generating an output voltage ripple signal based on a reference voltage,
   wherein the controller is configured to use the pulse control signal in at least one of the current sense circuit and the voltage ramp generator.

2. The constant on-time pulse width control-based apparatus of claim 1, wherein the controller comprises:
   the error amplifier, having a positive input for receiving the reference voltage and a negative input for receiving an output voltage signal of the voltage converter, to generate the output voltage ripple signal;
   a high gain compensator, coupled to the negative input and an output of the error amplifier, for compensating the output voltage ripple signal with a high gain.

3. The constant on-time pulse width control-based apparatus of claim 2, wherein the high gain compensator comprises:
   a first resistor connected with a first capacitor in series, the resistor and the first capacitor being connected between the negative input and the output of the error amplifier;
   a second capacitor, connected with the resistor and the first capacitor in parallel; and
   a third resistor, having one end coupled to the output voltage signal and having another end coupled to the first resistor and the negative input of the error amplifier.

4. The constant on-time pulse width control-based apparatus of claim 1, wherein the controller comprises:
   the error amplifier, having a positive input for receiving the reference voltage and a negative input for receiving an output voltage signal of the voltage converter, to generate the output voltage ripple signal;
   a high gain compensator, coupled to an output of the error amplifier and a ground level, for compensating the output voltage ripple signal with a high gain.

5. The constant on-time pulse width control-based apparatus of claim 4, wherein the high gain compensator comprises:
   a resistor connected with a first capacitor in series, the resistor and the first capacitor being connected between the output of the error amplifier and the ground level; and
   a second capacitor, connected with the resistor and the first capacitor in parallel.

6. The constant on-time pulse width control-based apparatus of claim 1, wherein the controller comprises:
   the current sense circuit, configured for detecting the inductor current signal from the inductor of the output stage circuit; and
   the voltage ramp generator, coupled to the current sense circuit, configured for generating the voltage ramp signal;
   wherein the controller is arranged for generating an emulated current ramp signal as one of the resultant signals provided for the comparator by summing up the voltage ramp signal and a direct-current level of the detected inductor current signal; and, the controller is arranged for amplifying and generating an output voltage ripple signal as another of the resultant signals provided for the comparator based on the reference voltage.

7. The constant on-time pulse width control-based apparatus of claim 1, wherein the controller comprises:
   the current sense circuit, configured for detecting the inductor current signal from the inductor of the output stage circuit; and
   the voltage ramp generator, coupled to the current sense circuit, configured for generating the voltage ramp signal as one of the resultant signals provided for the comparator;
   wherein the controller is arranged for generating another of the resultant signals provided for the comparator by subtracting a direct-current level of the detected inductor current signal from the amplified output voltage ripple signal.

8. The constant on-time pulse width control-based apparatus of claim 1, wherein the voltage ramp generator comprises:
   a voltage source, configured for providing a direct-current voltage level;
   a current source, configured for providing a current;
   a capacitor, connected between the voltage source and the current source in series;
   a switch, connected with the capacitor in parallel;
   wherein an output of the voltage ramp generator is disposed between the current source and the capacitor; the controller controls the switch to be short during the on-time pulse width to provide the direct-current voltage level as the voltage ramp signal, and controls the switch to be open during an off-time pulse width to provide a slowly discharged voltage level as the voltage ramp signal.

9. The constant on-time pulse width control-based apparatus of claim 1, wherein the current sense circuit comprises:
   a current sense amplifier, configured for sensing and amplifying the inductor current signal; and
   a sample/hold unit, coupled to the current sense amplifier, configured for sampling and holding a direct-current level of the inductor current signal.

10. A constant on-time pulse width control-based method used in a voltage converter, comprising:
   using a comparator to generate a logic control signal according to two resultant signals of a controller;
   generating a pulse control signal with an on-time pulse width to charge an output capacitor of the voltage converter according to the logic control signal; and
   using the controller to generate the two resultant signals to the comparator by detecting an inductor current signal from an inductor of the output stage circuit, generating a voltage ramp signal, amplifying and generating an output voltage ripple signal based on a reference voltage,
   wherein at least one of detecting the inductor current signal and generating the voltage ramp signal is performed using the pulse control signal.

* * * * *